(12) United States Patent
Greco et al.

(10) Patent No.: US 7,751,559 B2
(45) Date of Patent: Jul. 6, 2010

(54) SECURE TRANSMISSION OF CRYPTOGRAPHIC KEY

(75) Inventors: Paul Merrill Greco, Tucson, AZ (US); Melanie Jean Sandberg, Tucson, AZ (US); Scott Jeffrey Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 11/530,014

(22) Filed: Sep. 7, 2006

(65) Prior Publication Data

US 2008/0069343 A1    Mar. 20, 2008

(51) Int. Cl.
   *H04L 9/18* (2006.01)
(52) U.S. Cl. .......................... 380/44; 713/193; 380/277
(58) Field of Classification Search .................. None
   See application file for complete search history.

(56) References Cited

U.S. PATENT DOCUMENTS

| | | | |
|---|---|---|---|
| 6,023,643 | A | 2/2000 | Jesionowski |
| 6,295,361 | B1 | 9/2001 | Kadansky et al. |
| 6,567,914 | B1 | 5/2003 | Just et al. |
| 6,915,434 | B1 | 7/2005 | Kuroda et al. |
| 6,918,040 | B2 | 7/2005 | Ries et al. |
| 6,950,522 | B1 | 9/2005 | Mitchell et al. |
| 7,013,389 | B1 | 3/2006 | Srivastava et al. |
| 7,065,214 | B2 | 6/2006 | Ishiguro et al. |
| 7,327,846 | B1 * | 2/2008 | Chang .......................... 380/285 |
| 2001/0044897 | A1 | 11/2001 | Ishiguro et al. |
| 2002/0164035 | A1 | 11/2002 | Yokota et al. |
| 2002/0164036 | A1 * | 11/2002 | Stransky et al. ............. 380/285 |
| 2003/0074319 | A1 * | 4/2003 | Jaquette ........................ 705/51 |
| 2003/0081787 | A1 | 5/2003 | Kallahalla et al. |
| 2003/0097558 | A1 * | 5/2003 | England et al. ............. 713/155 |
| 2003/0099362 | A1 | 5/2003 | Rollins |
| 2004/0111625 | A1 * | 6/2004 | Duffy et al. ................. 713/186 |
| 2004/0252841 | A1 * | 12/2004 | Henry et al. ................. 380/277 |
| 2005/0071591 | A1 | 3/2005 | Goodman et al. |

(Continued)

FOREIGN PATENT DOCUMENTS

CN    1202658    12/1998

(Continued)

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, IBM, by inventors B. G. Goodman, J.A. Fisher, and L.G. Jesionowski.

(Continued)

*Primary Examiner*—Gilberto Barron, Jr.
*Assistant Examiner*—David Le
(74) *Attorney, Agent, or Firm*—Rabindranath Dutta; Konrad Raynes & Victor LLP (57) ABSTRACT

Provided are a method, system and article of manufacture, wherein a cryptographic key generator generates a cryptographic key. The cryptographic key generator encrypts the cryptographic key with a session key that is available to both the cryptographic key generator and a cryptographic unit. The encrypted cryptographic key is transmitted across a link from the cryptographic key generator to the cryptographic unit.

20 Claims, 7 Drawing Sheets

U.S. PATENT DOCUMENTS

| | | |
|---|---|---|
| 2005/0086471 A1 | 4/2005 | Spencer |
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0062383 A1 | 3/2006 | Kaneda et al. |
| 2007/0280483 A1* | 12/2007 | Fu et al. .................... 380/286 |

FOREIGN PATENT DOCUMENTS

| | | |
|---|---|---|
| EP | 0874299 A2 | 10/1998 |
| EP | 0874299 A3 | 10/1999 |
| EP | 0874299 B1 | 4/2008 |

OTHER PUBLICATIONS

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, IBM, by inventors B.G. Goodman, G.A. Jaquette, L.G. Jesionowski and P.M. Greco.

U.S. Patent Application entitled "Keyless Copy of Encrypted Data", U.S. Appl. No. 11/530,008, filed Sep. 7, 2006, IBM, by inventors P.M. Greco and G.A. Jaquette.

U.S. Patent Application entitled "Key Generation and Retrieval Using Key Servers", U.S. Appl. No. 11/530,006, filed Sep. 7, 2006, IBM, by inventors P.M. Greco, .TJ. Hahn and G.A. Jaquette.

U.S. Patent Application entitled "Maintaining Encryption Key Integrity", U.S. Appl. No. 11/530,012, filed Sep. 7, 2006, IBM, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, IBM, by inventors P.M. Greco, G.A. Jaquette, and W.E. Rhoten.

U.S. Patent Application entitled "Detection and Handling of Encryption Key and Initialization Vector", U.S. Appl. No. 11/530,010, filed Sep. 7, 2006, IBM, by inventors P.M. Greco, M.J. Sandberg and S.J. Schaffer.

U.S. Patent Application entitled "Verification of Encryption Key", U.S. Appl. No. 11/530,009, filed Sep. 7, 2006, IBM, by inventors P.M. Greco, S. Halevi and G.A. Jaquette.

U.S. Patent Application entitled "Automatically Filling a Drive Table", U.S. Appl. No. 11/530,013, filed Sep. 7, 2006, IBM, by inventors T.J. Hahn and G.A. Jaquette.

U.S. Patent Application entitled "Validating an Encryption Key File on Removable Storage Media", U.S. Appl. No. 11/530,019, filed Sep. 7, 2006, IBM, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, IBM, by inventors B.G. Goodman and L.G. Jesionowski.

U.S. Patent Application entitled "Recovering Remnant Encrypted Data on a Removable Storage Media", U.S. Appl. No. 11/530,021, filed Sep. 7, 2006, IBM, by inventors E.M. Dawson, P.M. Greco, G.A. Jaquette and J.M. Karp.

U.S. Patent Application entitled "Rekeying Encryption for Removable Storage Media", U.S. Appl. No. 11/470,994, filed Sep. 7, 2006, IBM, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, IBM, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, IBM, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, IBM, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, IBM, by inventors P.M. Greco, S. Halevi, and G.A. Jaquette.

Abstract for CN1202658, published on Dec. 23, 1998, 1 p [Abstract for corresponding case EP0874299A2].

Chinese OA dated Nov. 27, 2009 for Chinese Application No. 200710148377.1 filed Aug. 31, 2007, 8 pp.

* cited by examiner

FIG. 7 ized cryptographic key.
SECURE TRANSMISSION OF CRYPTOGRAPHIC KEY

BACKGROUND

1. Field

The disclosure relates to a method, system, and article of manufacture for the secure transmission of a cryptographic key.

2. Background

Hardware and software based cryptographic mechanisms may be used for encrypting and decrypting electronic data. Symmetric key cryptography is a cryptographic mechanism in which a sender and a receiver of a message share a single, common cryptographic key that is used to encrypt and decrypt the message where the message may include a plurality of data records. The single common cryptographic key is referred to as a symmetric cryptographic key. In contrast to symmetric key cryptography, public-key cryptography uses two cryptographic keys—a public key to encrypt messages and a private key to decrypt the messages. Symmetric key cryptography may also be referred to secret key cryptography and symmetrically encrypted data is data that has been encrypted with a symmetric cryptographic key.

An exemplary cryptographic mechanism is the Advanced Encryption Standard (AES) that can be used to protect electronic data. The AES uses a type of symmetric cryptographic key called a symmetric block cipher that can encrypt and decrypt data. Encryption can convert data to an unintelligible form called encrypted data, and decrypting the encrypted data converts the data back into its original form. Further details of the AES may be found in the publication, "Specification for the Advanced Encryption Standard (AES)," Federal Information Processing Standards Publication 197, Nov. 26, 2001.

To further address the issues of electronic data storage protection, the "IEEE Std 1619.1" standard provides mechanisms for data protection by specifying encryption with authentication and length-expansion. The Std 1619.1 standard provides methods suitable for ensuring the privacy and integrity of stored data within applications requiring a high level of assurance. To this end, the IEEE Std 1619.1 standard specifies the AES cipher as used in the Galois/counter mode (GCM) of authentication and encryption of data. Further details of the IEEE Std 1619.1 standard may be found in the publication, "IEEE P1619.1™/D8 Draft Standard Architecture for Encrypted Variable Block Storage Media," Institute of Electrical and Electronics Engineers, Inc., June 2006. Further details of GCM may be found in the publication, "The Galois/Counter Mode of Operation (GCM)" by David A. McGrew and John Viega, May 31, 2005. A cryptographic module that supports GCM may use the GCM algorithm that uses AES with a key of a predetermined length, and such an algorithm may be referred to as "AES-GCM". Such exemplary cryptographic mechanisms for electronic data storage protection may be implemented either in hardware or software.

SUMMARY OF THE DESCRIBED EMBODIMENTS

Provided are a method, system, and article of manufacture, wherein a cryptographic key generator (generates a cryptographic key. The cryptographic key generator encrypts the cryptographic key with a session key that is available to both the cryptographic key generator and a cryptographic unit. The encrypted cryptographic key is transmitted across a link from the cryptographic key generator the cryptographic unit.

In further embodiments, the cryptographic unit receives the encrypted cryptographic key and decrypts the encrypted cryptographic key with a copy of the session key stored at the cryptographic unit to generate the cryptographic key.

In still further embodiments, the cryptographic unit writes the generated cryptographic key to a register. The register is prevented from being read from or being written to by microcode in the cryptographic unit, wherein the register is inaccessible to entities that are external to the cryptographic unit.

In further embodiments, the cryptographic unit decrypts the encrypted cryptographic key with the session key to generate the cryptographic key, wherein the cryptographic unit uses the generated cryptographic key for encryption and decryption of data.

In additional embodiments, the session key is unavailable for decrypting the encrypted cryptographic key while the encrypted cryptographic key is undergoing transmission across the link.

In yet additional embodiments, the cryptographic key generator is included in a host that communicates with the cryptographic unit over the link, and wherein the cryptographic unit is included in a storage device and provides security to data stored in the storage device.

In further embodiments, the cryptographic key is never transmitted in clear across the link, and wherein the cryptographic key is used as an Advanced Encryption Mode (AES) cipher in the Galois/counter mode (GCM) of authentication and encryption of data.

Certain embodiments are implemented in a system, comprising a cryptographic key generator, a cryptographic unit, and a link coupling the cryptographic key generator to the cryptographic unit. In additional embodiments, the cryptographic key generator in a tape drive. In yet additional embodiments, the tape drive is included in a tape library. In certain embodiments, the cryptographic key generator is included in a host.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Many customers need data encryption to ensure security for data. Certain customers may need an assurance that data would be unreadable should the data ever be lost or stolen. There are several different encryption mechanisms that can be implemented in hardware to generate encrypted data. An important element in determining the integrity of the encrypted data is the handling of the cryptographic key used for generating the encrypted data. If the cryptographic key that is used for encryption is not handled in a secure manner, then in certain situations it may not matter whether the data has been encrypted or not.

Certain embodiments allow a cryptographic key that is used for encryption and decryption to be transmitted securely across a link that couples a cryptographic key generator and a cryptographic unit, wherein the cryptographic unit encrypts data by using the securely transmitted cryptographic key. In certain embodiments, the cryptographic key is never transmitted in a clear state across the link. Additionally, once the cryptographic key is written in the cryptographic unit, the cryptographic key can never leave the cryptographic unit in a clear state.

EXEMPLARY EMBODIMENTS

Figure 1:
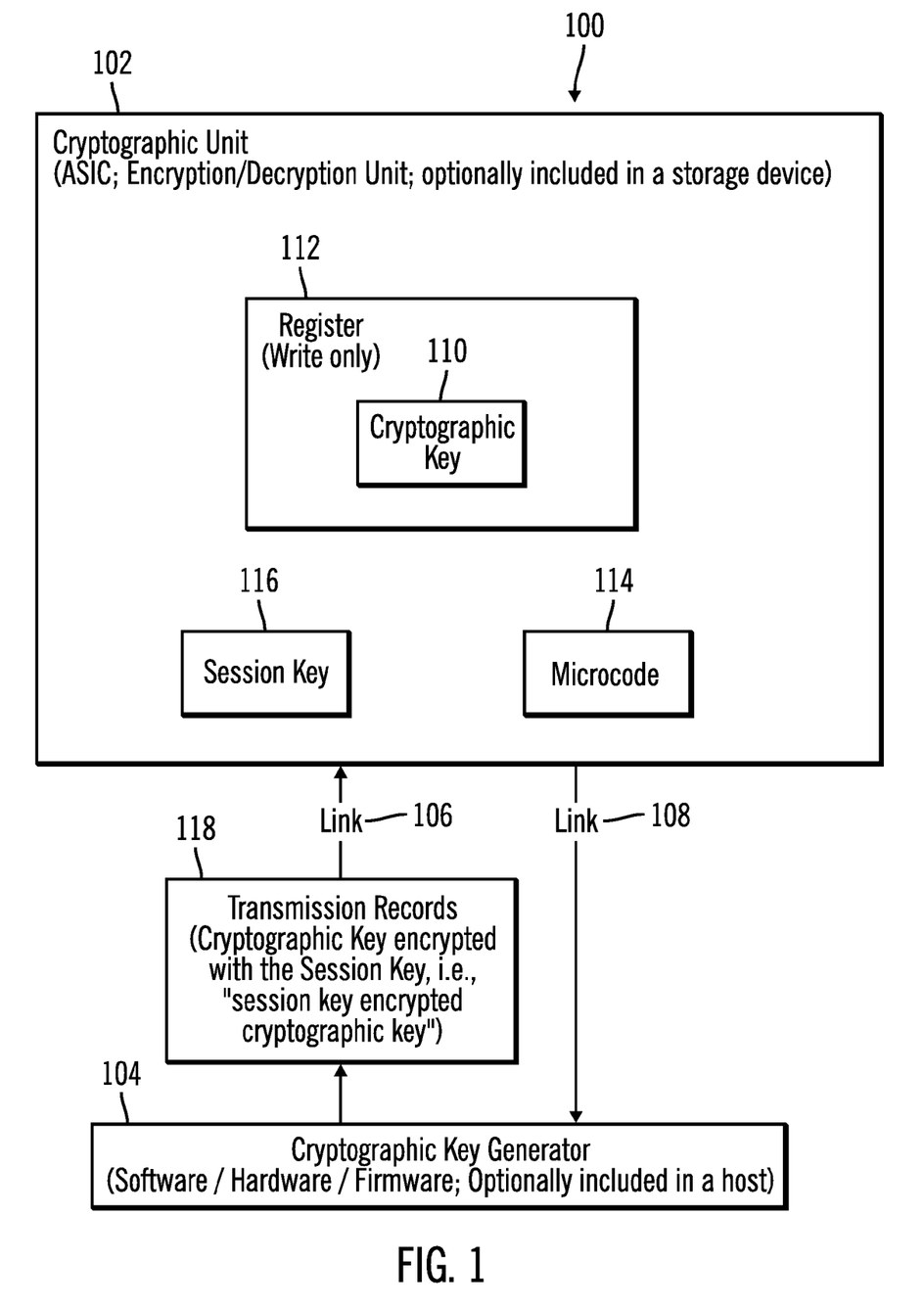
FIG. 1 illustrates a block diagram of a computing environment in accordance with certain embodiments.

FIG. 1 illustrates a block diagram of a computing environment 100 in accordance with certain embodiments. The computing environment 100 includes at least one cryptographic unit 102 that may be coupled to a cryptographic key generator 104 either directly or over a network such as a storage area network. The coupling of the cryptographic unit 102 to the cryptographic key generator 104 is represented by links 106, 106 in FIG. 1. In certain alternative embodiments, the computing environment 100 may comprise one or more computing systems that may include one or more storage devices, where the storage devices may comprise of one of more tape devices, disk drives, or any other suitable storage devices known in the art, and where the computing systems may comprise any computational device including those presently known in the art, such as, a personal computer, a workstation, a mainframe, a midrange computer, a network appliance, a palm top computer, a telephony device, a blade computer, a hand held computer, etc.

The cryptographic unit 102 may be implemented in application specific integrated circuit (ASIC) and may be referred to as an encryption/decryption unit. In still further embodiments, the cryptographic unit 102 may be implemented in software, hardware, firmware, or any combination thereof. While FIG. 1 shows a stand-alone cryptographic unit 102, in certain embodiments the cryptographic unit 102 may be implemented in a computational device or a storage device. For example, a storage device that includes the cryptographic unit 102 may use the cryptographic unit 102 to generate symmetrically encrypted data for storage media. In a further exemplary embodiment, the cryptographic unit 102 may be included in a tape device that uses the cryptographic unit 102 to symmetrically encrypt data for storage on tapes.

The cryptographic unit 102 may use the cryptographic key 110 to encrypt plain text data (plain text data is data that is in a clear state, i.e., the data has not been encrypted), and decrypt data that has been encrypted. In certain embodiments, the cryptographic key 110 is a symmetric cryptographic key and is inaccessible for reading from any entity that is external to the cryptographic unit 102. Cryptographic mechanisms, such as, AES-GCM or other mechanisms may be used by the cryptographic unit 102 to encrypt or decrypt data. The cryptographic key 110 is stored in one or more write only registers 112 and a new cryptographic key can only be loaded in the cryptographic unit 102 by overwriting the write only register 112 that stores the cryptographic key 102 with the new cryptographic key.

The cryptographic unit 106 may also include microcode 114 that may be used to implement mechanisms for writing the cryptographic key 110 to the write only register 112 and perform other operations.

The cryptographic unit 102 also includes a session key 116 that can be used for encrypting the cryptographic key 110. The session key 116 may comprise a secret key that is available only to the cryptographic unit 102 and the cryptographic key generator 104.

The cryptographic key generator 104 is a device or a function that may be implemented in software, hardware, firmware, or any combination thereof. While FIG. 1 shows a stand-alone cryptographic key generator 104, in certain embodiments the cryptographic key generator 104 may be implemented and included in a computational device, such as a host.

The cryptographic key generator 104 may transmit one or more transmission records 118 to the cryptographic unit 102 across the link 106. The transmission records 118 include the cryptographic key 110 encrypted with the session key 116, i.e., the transmission records do not include the cryptographic key 110 in the clear. The transmission records 118 may be referred to as "session key encrypted cryptographic key" 118.

In certain embodiments, the cryptographic unit 102 receives the "session key encrypted cryptographic key" 118 and uses the session key 116 to decrypt the "session key encrypted cryptographic key" 118 and determine the cryptographic key 110. The cryptographic key 110 is then written by the microcode 114 in the write only register 112.

Therefore, FIG. 1 illustrates certain embodiments in which a cryptographic key 110 is encrypted before the cryptographic key 110 is transmitted across the link 106. The cryptographic key 110 is not available in the clear while the cryptographic key 110 is undergoing transmission across the link 106. Therefore, security is provided to the cryptographic key 110 by maintaining encryption of the cryptographic key 110 during transmission.

Figure 2:
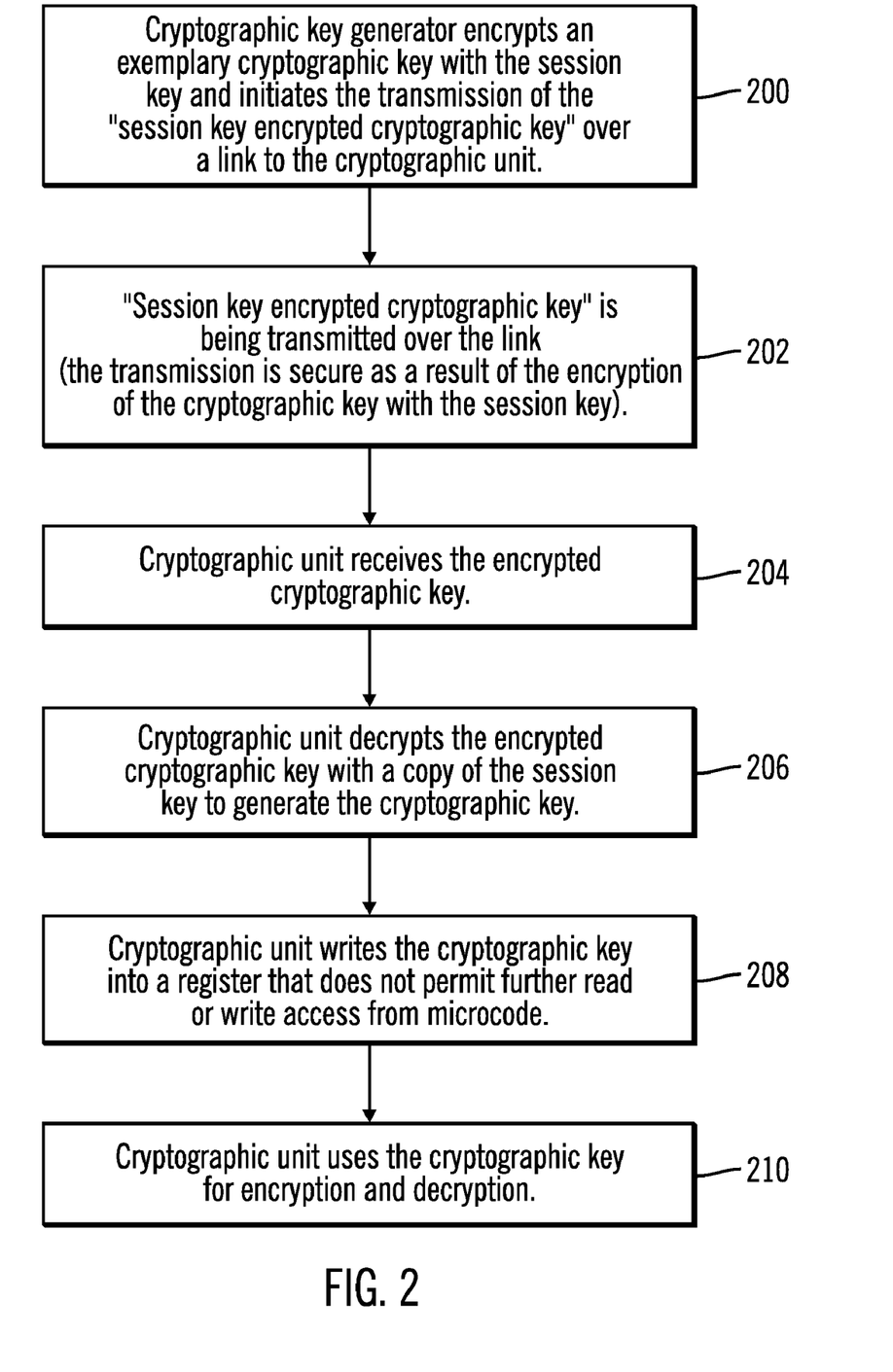
FIG. 2 illustrates a first flowchart that shows first operations for the secure transmission and usage of a cryptographic key, in accordance with certain embodiments.

FIG. 2 illustrates a first flowchart that shows first operations for the secure transmission and usage of a cryptographic key 110, in accordance with certain embodiments. The operations illustrated in FIG. 2 may be implemented in the computing environment 100.

Control starts at block 200, where the cryptographic key generator 104 encrypts and exemplary cryptographic key with an exemplary session key and initiates the transmission of the "session key encrypted cryptographic key" 118 over a link 106 to the cryptographic unit 102. The cryptographic key generator 104 is the provider of the "session key encrypted cryptographic key" 118 to the cryptographic unit 102. In certain embodiments a user may use the cryptographic key generator 104 to generate and initiate the transmission of "session key encrypted cryptographic key" 118 to the cryptographic unit 102.

Control proceeds to block 202, where the "session key encrypted cryptographic key" 118 is being transmitted over the link 106. The "session key encrypted cryptographic key" 118 is being transmitted in cipher text and as a result the exemplary cryptographic key cannot be determined by entities that do not possess the exemplary session key. Therefore, the exemplary cryptographic key is being securely transmitted over the link 106 as a result of the encryption of the exemplary cryptographic key with the exemplary session key, The cryptographic unit 102 receives (at block 204) the "session key encrypted cryptographic key" 118. The cryptographic unit 102 decrypts (at block 206) the "session key encrypted cryptographic key" 118 with the session key 116 to generate the cryptographic key 116, where the session key 116 is a copy of the exemplary session key that was to encrypt the exemplary cryptographic key. The microcode 114 of the cryptographic unit 102 writes (at block 208) the cryptographic key 116 into a write only register 112. The cryptographic unit 102 uses (at block 210) the cryptographic key 110 for encryption and decryption of data.

Therefore, FIG. 2 illustrates certain embodiments in which an exemplary cryptographic key is transmitted in cipher text across the link 106 by sending the "session key encrypted cryptographic key" 118. The "session key encrypted cryptographic key" 118 is decrypted with the session key 116 stored in the cryptographic unit 102 to generate the cryptographic key 110 that is used for encryption and decryption of data.

Figure 3:
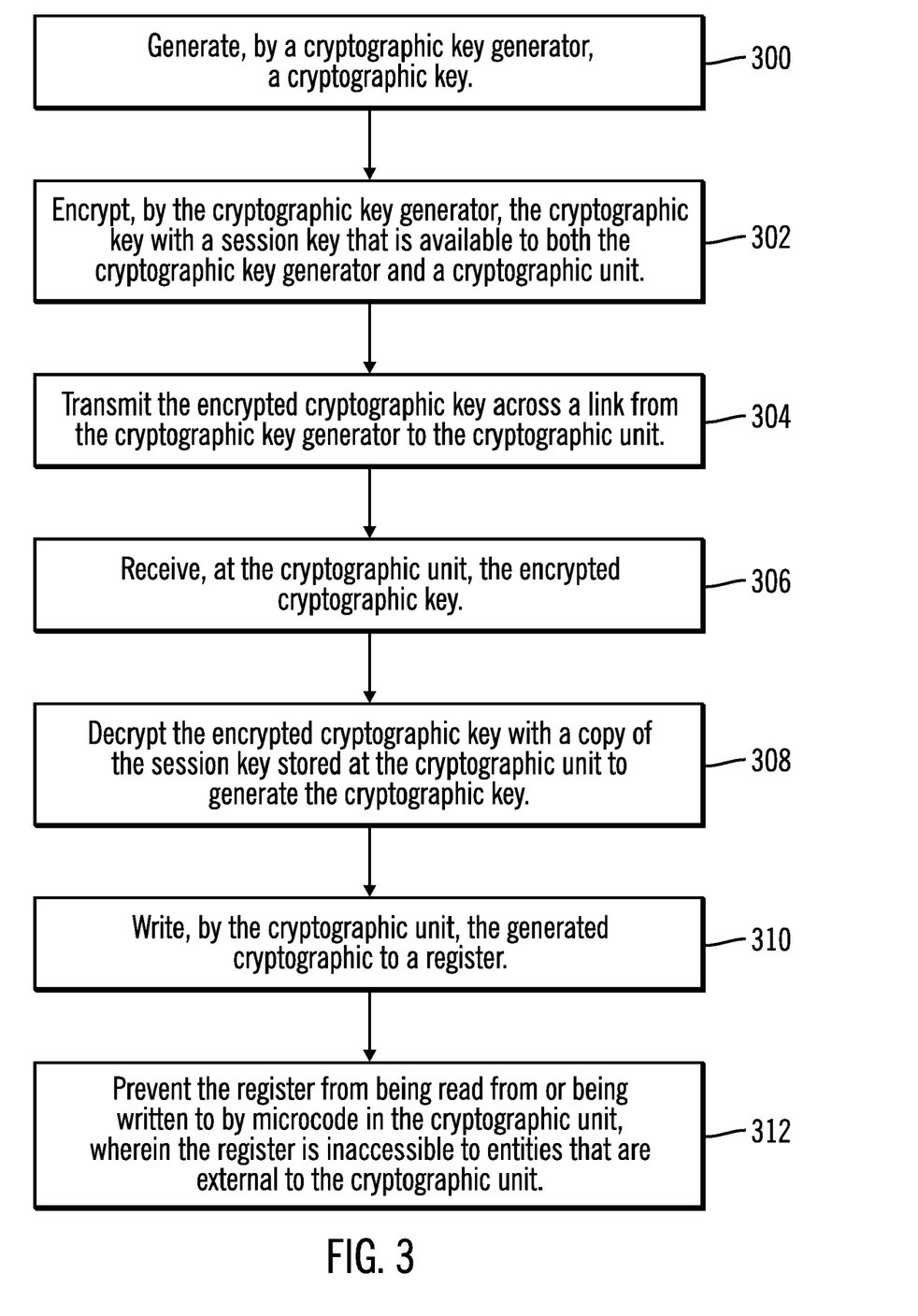
FIG. 3 illustrates a second flowchart that shows second operations for the secure transmission and usage of a cryptographic key, in accordance with certain embodiments.

FIG. 3 illustrates a second flowchart that shows second operations for the secure transmission and usage of a cryptographic key 110, in accordance with certain embodiments. The operations illustrated in FIG. 3 may be implemented in the computing environment 100.

Control starts at block 300, where a cryptographic key generator 104 generates a cryptographic key. The cryptographic key generator 104 encrypts (at block 302) the cryptographic key with a session key 116 that is available to both the cryptographic key generator 104 and a cryptographic unit 102. The encrypted cryptographic key 118 is transmitted (at block 304) across a link 106 from the cryptographic key generator 104 to the cryptographic unit 102.

The cryptographic unit 102 receives (at block 306) the encrypted cryptographic key 118. Control proceeds to block 308, where the cryptographic unit 102 decrypts the encrypted cryptographic key 118 with a copy of the session key 116 stored at the cryptographic unit 102 to generate the cryptographic key 110.

The cryptographic unit 102 writes (at block 310) the generated cryptographic key 110 to a register 112. The cryptographic unit prevents (at block 312) the register 112 from being read from or being written to by microcode 114 in the cryptographic unit 102, wherein the register 112 is inaccessible to entities that are external to the cryptographic unit 102.

Therefore FIG. 3 illustrates certain embodiments in which a cryptographic key is received under encryption by a cryptographic unit 102 that decrypts the encrypted cryptographic key for storage in one or more write only registers 112 that are inaccessible to entities external to the cryptographic unit 102.

Certain embodiments allow a cryptographic key that is used for encryption and decryption to be transmitted securely across a link 106 that couples a cryptographic key generator 104 and a cryptographic unit 102, wherein the cryptographic unit 102 encrypts data by using the securely transmitted cryptographic key. In certain embodiments, the cryptographic key is never transmitted in a clear state across the link. Additionally, once the cryptographic key is written in the cryptographic unit 102, the cryptographic key can never leave the cryptographic unit in a clear state. In certain embodiments, the session key is unavailable for decrypting the encrypted cryptographic key while the encrypted cryptographic key is undergoing transmission across the link 106. In certain other embodiments, the cryptographic key generator 104 is included in a host that communicates with the cryptographic unit 102 over the link 106, wherein the cryptographic unit 102 is included in a storage device and provides security to data stored in the storage device. In further embodiments, the cryptographic key is never transmitted in clear across the link 106, and the cryptographic key is used as an Advanced Encryption Mode (AES) cipher in the Galois/counter mode (GCM) of authentication of encryption of data.

Storage Library and Storage Device Related Embodiments

Figure 4:
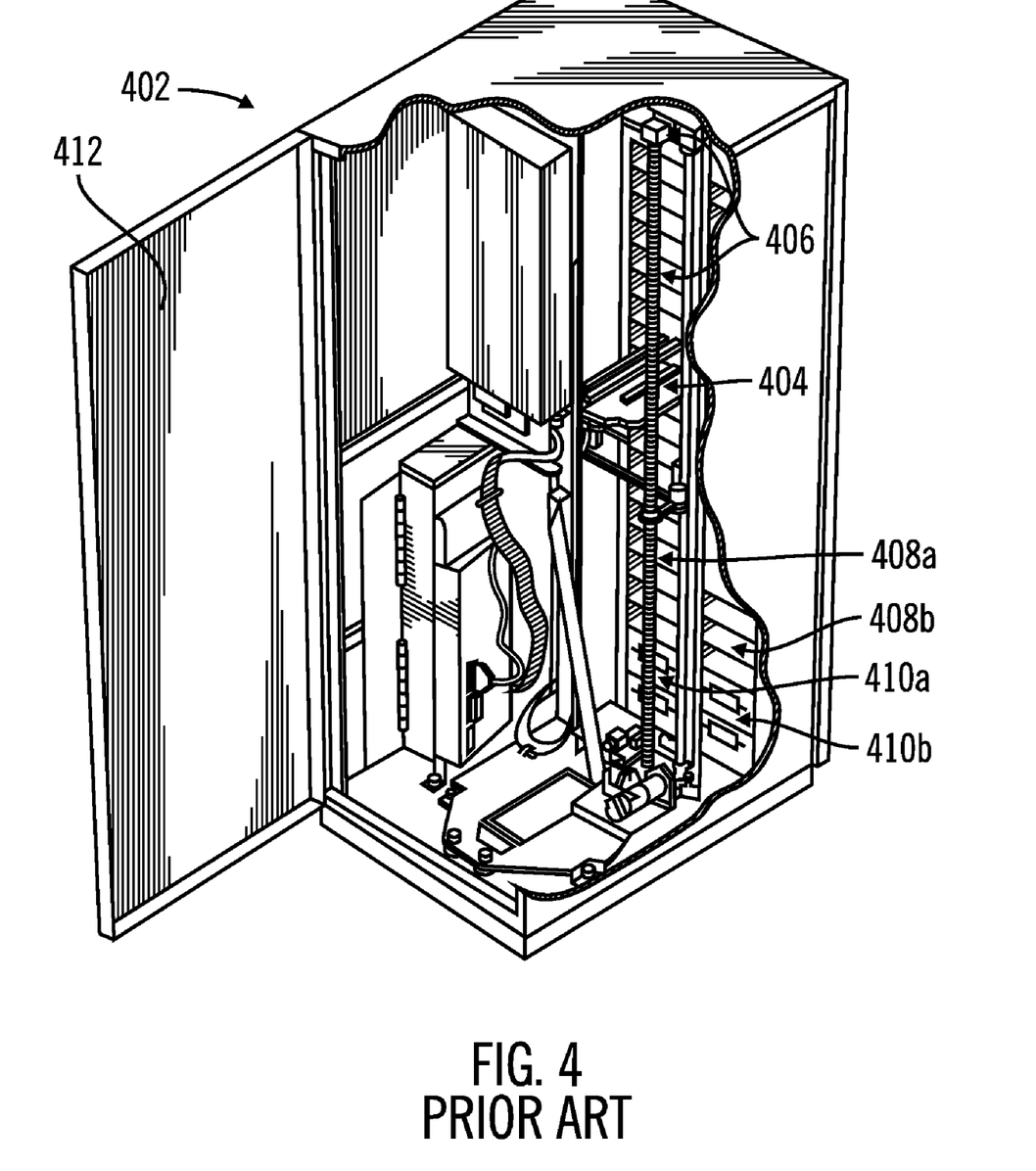
FIG. 4 illustrates an embodiment of a storage library in accordance with certain embodiments.
Figure 5:
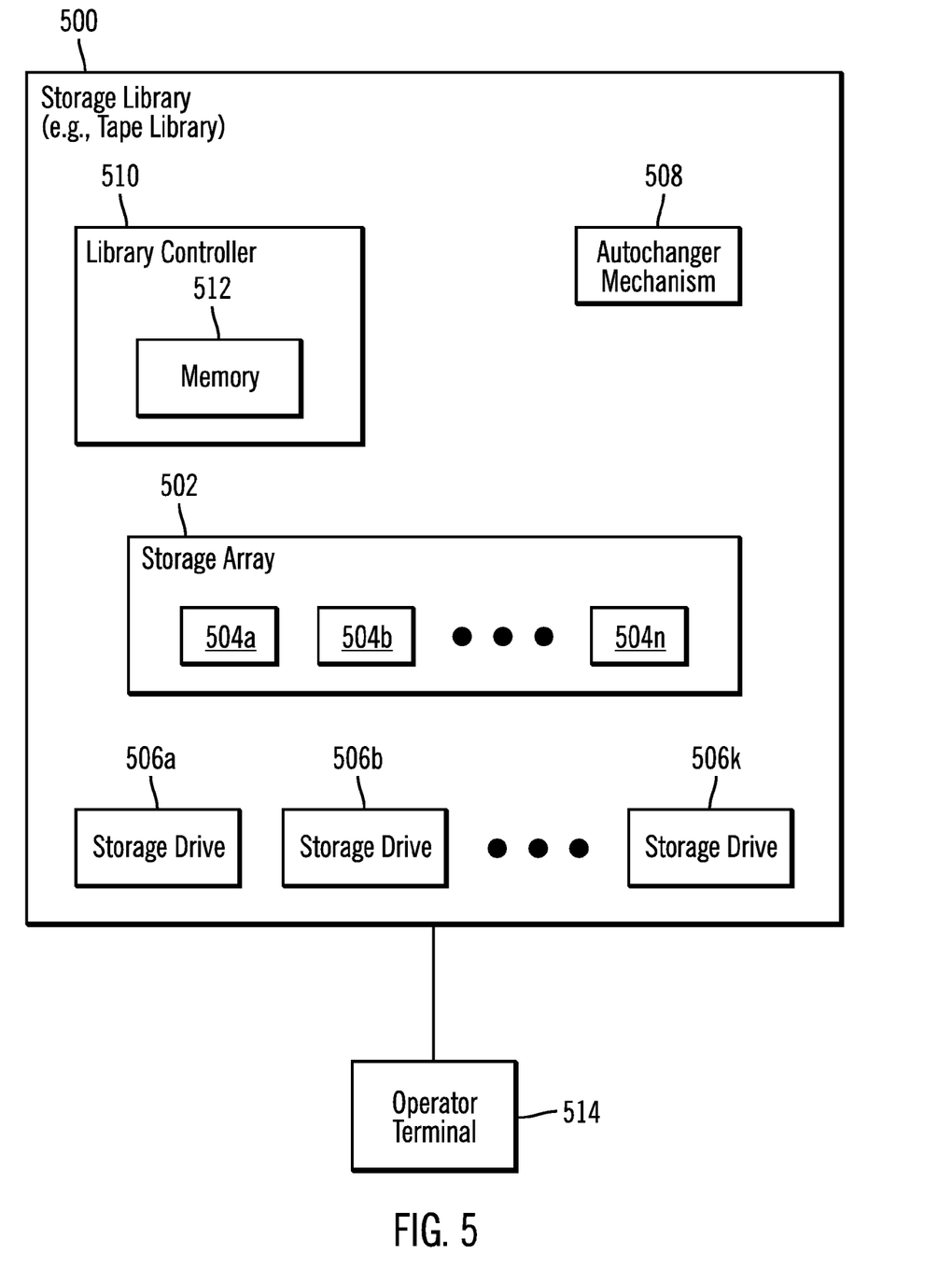
FIG. 5 illustrates an embodiment of components in a storage library, in accordance with certain embodiments.
Figure 6:
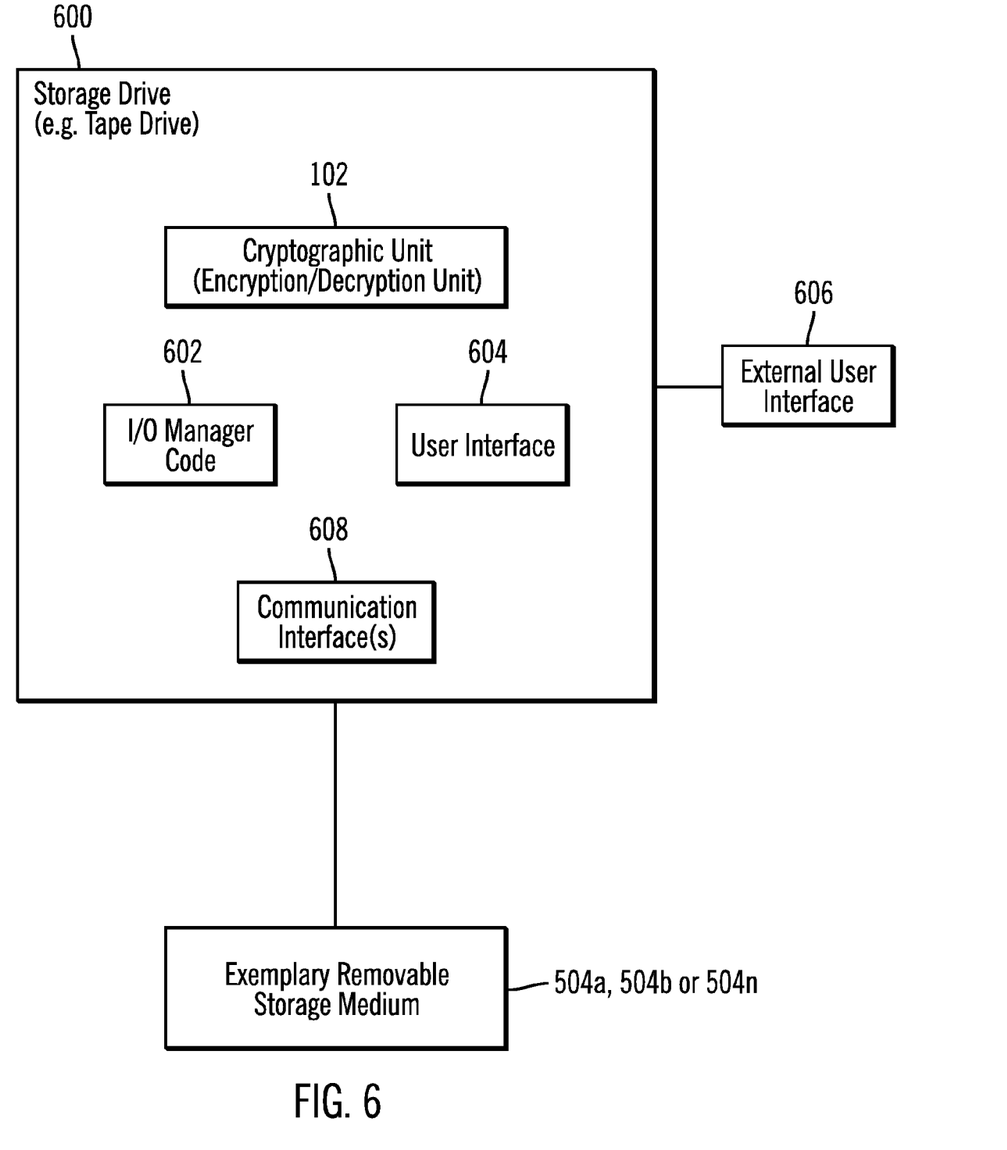
FIG. 6 illustrates an embodiment of components of a storage drive capable of interfacing with a removable storage media, in accordance with certain embodiments

FIGS. 1-3 have described certain embodiments which illustrate certain interactions of a cryptographic unit 102 with a cryptographic key generator 104 that may be implemented in a host. FIGS. 4-6 illustrate certain additional embodiments in which the cryptographic unit 102 is included a storage device, such as a tape drive, wherein in certain embodiments one or more storage devices may be implemented in a storage library.

FIG. 4 illustrates a storage library, such as an automated tape library 402, known in the prior art. The tape library 402 includes a library controller, an input/output station, a picker assembly 404, a carriage assembly 406, storage cells 408a, 408b, and optical disk drives (not shown). The term "library element" as used herein refers to any slot in the automated tape library 402 in which storage cartridges may be disposed, e.g., the input/output stations, the storage cells 408a, 408b, etc. The library controller includes a processor, RAM, and other controls and interfaces to direct the actions of the library components. The library controller further interacts with a host processor to respond to library commands transmitted from the host processor. The input/output station is the opening through which the user may insert or remove a cartridge. An operator panel on the outside of the box housing the tape library 402 allows the user to communicate with the library controller. When adding a cartridge through, the input/output slot, the user may indicate the addition of a cartridge using the operator panel. The tape library 402 also includes an access door 412 through which the user may add or remove cartridges maintained in the storage cells 408a, 408b.

The tape library 402 has two columns of storage cells 408a, 408b and storage drives 410a, 410b that perform read and write operations with respect to the storage media cartridges. A picker assembly 404 is capable of manipulating the storage media cartridges in the library elements. A carriage assembly 406 moves the picker assembly 404, and any media storage cartridge held by the picker assembly 404, among the library elements. The carriage assembly 406 transports the picker assembly 404 to a destination library element. The picker assembly 404 can rotate to turn the storage media cartridge over. The picker assembly 404 has a finger mechanism to remove or insert a storage media cartridge to a library element. Once inserted in the storage drive 410a, 410b, data can be read from the storage media cartridge and sent to a host processor. Data transmitted from the host processor can be written to the storage media cartridge inserted in a storage drive 410a, 410b. One or more of the storage cells 408a, 408b in each column may comprise an Input/Output slot through which a user may remove a storage media cartridge from the tape library 402 or can insert a storage media cartridge into the tape library 402.

In further embodiments the tape library 402 may include distributed computing components, such as distributed controller, distributed storage cells and distributed picker assemblies. Yet further, the tape library 402 may, be partitioned into one or more logical libraries having multiple storage drives. Each storage drive may be configured independently of any other drive. In addition, groups of storage drives may be configured at the same time or with the same settings. This may include all storage drives in a frame, all storage drives in a logical library all storage drives in a physical library, or all storage drives selected from a list.

FIG. 5 illustrates an embodiment of an automated storage library 500 including a storage array 502, such as the storage cells 408a, 408b (FIG. 4), including removable storage media 504a, 504b . . . 504n; storage drives 506a, 506b, . . . , 506k, such as a tape drive, optical disk drive or other interface to which a removable storage media is coupled to for access; an autochanger mechanism 508 to transfer removable storage media 504a . . . 504n between the storage array 502 and storage drive 506a . . . 506k, such as the picker assembly 404 (FIG. 4); and a library controller 510.

The removable storage media 504a . . . 504n may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, etc.), or other suitable media. In certain embodiments, the removable storage media has a cartridge housing, such as the case with a magnetic tape cartridge or a removable disk drive, In certain embodiments, the library controller 510 is comprised of a microprocessor and various controls and interfaces to control the operation of the components in the automated library 500, including the autochanger mechanism 508 and storage drives 506a . . . 506k. The library controller 510 utilizes a memory 51 to store various information, such as a storage media map maintaining information on the location of removable storage media 504a . . . 504n in the library 500, including the content of the library elements in the storage array 502. The library controller 510 may comprise a single processing unit or distributed processing units.

The library controller 510 may further manage read/write operations with respect to removable storage media 504a . . . 504n in the storage library 500. A library operator may directly control operations and the management of removable storage media 504a . . . 504n through an operator terminal 514 coupled to the library 500 comprising of a display device and keyboard to interface with the library controller 510. Additionally, a host system (not shown) may send commands to the library controller 510 to control operations within the automated library 500 or perform read or write operations on volumes within removable storage media 504a . . . 504n managed by, the library 500, where the host system may communicate with the library 500 over a network or through a direct cable connection.

FIG. 6 illustrates an embodiment of a storage drive 600 that is capable of performing I/O operations with respect to a coupled exemplary removable storage media 504a, 504b, or 504n that are capable of being inserted into the storage drive 600. The storage drive 600 includes I/O manager code 602 to perform read/write operations with respect to a coupled removable storage media 504a, 504b, or 504n. The storage drive 600 includes a user interface 604 comprising user controls on the storage drive 600 housing to configure and control the storage drive 600. Further, in certain embodiments, an external user interface 606 may optionally be coupled to the storage drive 600 providing additional user controls used to configure and control the storage drive 600. The storage drive 600 may further include one or more communication interfaces 608, and the cryptographic unit 102 (shown in FIG. 1), and in certain embodiments any storage medium, such as a tape that is coupled to the cryptographic unit 102 may be included in the storage drive 600 and correspond to one of the removable storage media 504a, 504b or 504n. The storage drive 600 may communicate with the cryptographic key generator 104 (shown in FIG. 1) that is included in a host.

The user interface 604 and optional external user interface 606 may include user interface elements for interacting with the storage drives 506a . . . 506k, such as an eject button for manually unloading removable storage media 504a, 504b or 504n, up/down buttons for navigating a list of items enter/exit buttons for selecting items or exiting from a menu or list, and one or more status displays (e.g., a light or LED (Light Emitting Diode), a numeric display, and alphanumeric display, etc.) The external user interface 606 may comprise a computer, workstation, personal computer, palm computer, web user interface, proprietary user interface, or any other device capable of providing a user interface for the storage drives 506a . . . 506k.

The cryptographic unit 102 and I/O manager code 602 may be implemented as hardware logic in the storage drive 600 or in computer executable instructions that are accessed and executed by a processor (not shown) in the storage drive 600. In certain embodiments the storage drive 600 is a tape drive.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA). Application Specific Integrated Circuit (ASIC), etc.] or a computer readable storage medium, such as magnetic storage medium (e.g., hard disk drive, floppy disk, tape, etc.), optical storage (CD-ROM, optical disk, etc.), volatile and non-volatile memory devices [e.g.) Electrically Erasable Programmable Read Only Memory (EEPROM), Read Only Memory (ROM) Programmable Read Only Memory (PROM), Random Access Memory (RAM) Dynamic Random Access Memory (DRAM), Static Random Access Memory (SRAM), flash, firmware, programmable logic, etc.]. (Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable storage medium at the receiving and transmitting stations or devices. Additionally, the "article of manufacture" may comprise a combination of hardware and software components in which the code is embodied, processed, and executed. Of courses, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in certain operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
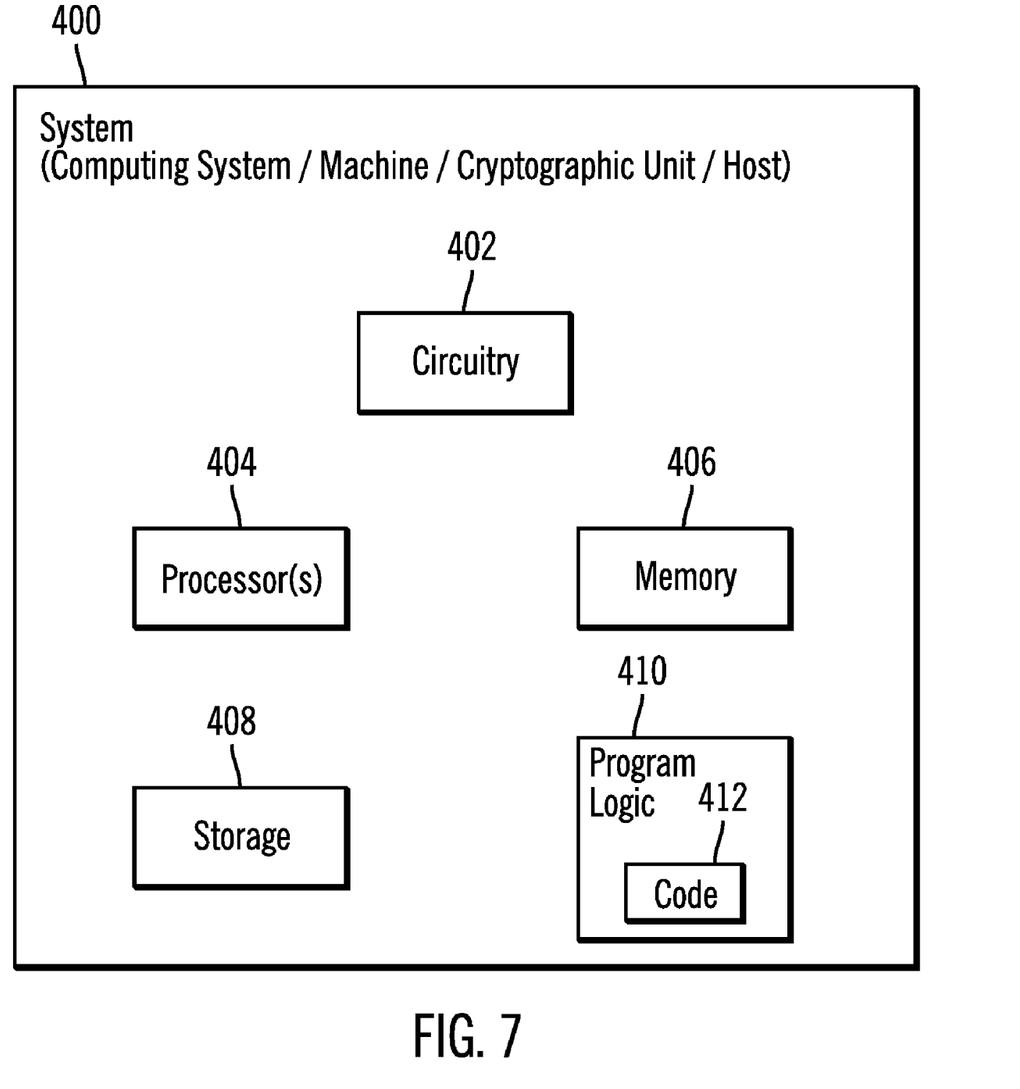
FIG. 7 illustrates the architecture of computing system, wherein in certain embodiments elements of the computing environment of FIG. 1 may be implemented in accordance with the architecture of the computing system.

FIG. 7 illustrates an exemplary computer system 700, wherein in certain embodiments the cryptographic unit 102 or the cryptographic key generator 104 of the computing environment 100 of FIG. 1 may be implemented in accordance with the computer architecture of the computer system 700. The computer system 700 may also be referred to as a system or a machine and may include a circuitry 702 that may in certain embodiments include a processor 704. The system 700 may also include a memory 706 (e.g., a volatile memory device) and storage 708. Certain elements of the system 700 may or may not be found in the cryptographic unit 102 or the cryptographic key generator 104 of FIG. 1. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed towards a method for deploying computing infrastructure by a person or via automated processing. Certain other embodiments may be directed towards integrating computer-readable code into a computing system, wherein the code in combination with the computing system is enabled to perform the operations described earlier.

At least certain of the operations illustrated in FIGS. 2 and 3 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

\* IEEE P1619.1 is a trademark or registered trademark of Institute of Electrical and Electronics Engineers, Inc.

What is claimed is:

1. A method, comprising:
   generating, by a cryptographic key generator that is maintained in a host containing a processor, a symmetric cryptographic key;
   encrypting, by the cryptographic key generator, the symmetric cryptographic key with a session key that is available to both the cryptographic key generator and a cryptographic unit that is maintained in a storage drive of a storage library_having a library_controller and an autochanger mechanism to transfer removable storage media accessible to the storage drive;

transmitting the encrypted symmetric cryptographic key across a link from the cryptographic key generator to the cryptographic unit;

decrypting the encrypted symmetric cryptographic key with a copy of the session key stored at the cryptographic unit to generate the symmetric cryptographic key and encrypting data with the symmetric cryptographic key to store in the removable storage media; and writing, by the cryptographic unit, the generated symmetric cryptographic key to a write only register;

wherein the write only register is inaccessible to entities that are external to the cryptographic unit; and loading a new symmetric cryptographic key into the cryptographic unit by overwriting the write only register in which the generated symmetric cryptographic key has been written with the new symmetric cryptographic key.

2. The method of claim 1, wherein the session key is unavailable for decrypting the encrypted symmetric cryptographic key while the encrypted symmetric cryptographic key is undergoing transmission across the link.

3. The method of claim 1, wherein the symmetric cryptographic key is never transmitted in clear across the link, and wherein the symmetric cryptographic key is used as an Advanced Encryption Mode (AES) cipher in the Galois/counter mode (GCM) of authentication and encryption of data.

4. The method of claim 1, wherein:
the storage drive in which the cryptographic key is maintained is a tape drive; and
the storage library is a tape library, wherein the tape drive is included within the tape library.

5. A system, comprising:
a storage drive;
a host coupled to the storage drive;
a cryptographic key generator maintained in the host;
a cryptographic unit maintained in the storage drive; and
a link coupling the cryptographic key generator to the cryptographic unit, wherein the system performs operations, the operations comprising:

generating, by a cryptographic key generator that is maintained in a host containing a processor, a symmetric cryptographic key;

encrypting, by the cryptographic key generator, the symmetric cryptographic key with a session key that is available to both the cryptographic key generator and a cryptographic unit that is maintained in a storage drive of a storage library_having a library_controller and an autochanger mechanism to transfer removable storage media accessible to the storage drive;

transmitting the encrypted symmetric cryptographic key across a link from the cryptographic key generator to the cryptographic unit;

decrypting the encrypted symmetric cryptographic key with a copy of the session key stored at the cryptographic unit to generate the symmetric cryptographic key and encrypting data with the symmetric cryptographic key to store in the removable storage media; and writing, by the cryptographic unit, the generated symmetric cryptographic key to a write only register;

wherein the write only register is inaccessible to entities that are external to the cryptographic unit; and loading a new symmetric cryptographic key into the cryptographic unit by overwriting the write only register in which the generated symmetric cryptographic key has been written with the new symmetric cryptographic key.

6. The system of claim 5, wherein the session key is unavailable for decrypting the encrypted symmetric cryptographic key while the encrypted symmetric cryptographic key is undergoing transmission across the link.

7. The system of claim 5, wherein the symmetric cryptographic key is never transmitted in clear across the link, and wherein the symmetric cryptographic key is used as an Advanced Encryption Mode (AES) cipher in the Galois/counter mode (GCM) of authentication and encryption of data.

8. The system of claim 5, wherein:
the storage drive in which the cryptographic key is maintained is a tape drive; and
the storage library is a tape library, wherein the tape drive is included within the tape library.

9. A system, comprising:
memory; and
processor coupled to the memory, wherein the processor performs:

generating, by a cryptographic key generator that is maintained in a host containing a processor, a symmetric cryptographic key;

encrypting, by the cryptographic key generator, the symmetric cryptographic key with a session key that is available to both the cryptographic key generator and a cryptographic unit that is maintained in a storage drive of a storage library_having a library_controller and an autochanger mechanism to transfer removable storage media accessible to the storage drive;

transmitting the encrypted symmetric cryptographic key across a link from the cryptographic key generator to the cryptographic unit;

decrypting the encrypted symmetric cryptographic key with a copy of the session key stored at the cryptographic unit to generate the symmetric cryptographic key and encrypting data with the symmetric cryptographic key to store in the removable storage media; and writing, by the cryptographic unit, the generated symmetric cryptographic key to a write only register;

wherein the write only register is inaccessible to entities that are external to the cryptographic unit; and loading a new symmetric cryptographic key into the cryptographic unit by overwriting the write only register in which the generated symmetric cryptographic key has been written with the new symmetric cryptographic key.

10. The system of claim 9, wherein the session key is unavailable for decrypting the encrypted symmetric cryptographic key while the encrypted symmetric cryptographic key is undergoing transmission across the link.

11. The system of claim 9, wherein the symmetric cryptographic key is never transmitted in clear across the link, and wherein the symmetric cryptographic key is used as an Advanced Encryption Mode (AES) cipher in the Galois/counter mode (GCM) of authentication and encryption of data.

12. The system of claim 9, wherein:
the storage drive in which the cryptographic key is maintained is a tape drive; and
the storage library is a tape library, wherein the tape drive is included within the tape library.

13. A non-transitory computer readable storage medium, wherein the non-transitory computer readable storage medium includes machine readable instructions, wherein the machine readable instructions cause operations on a machine, the operations comprising:

generating, by a cryptographic key generator that is maintained in a host containing a processor, a symmetric cryptographic key;

encrypting, by the cryptographic key generator, the symmetric cryptographic key with a session key that is available to both the cryptographic key generator and a cryptographic unit that is maintained in a storage drive of a storage library_having a library_controller and an autochanger mechanism to transfer removable storage media accessible to the storage drive;

transmitting the encrypted symmetric cryptographic key across a link from the cryptographic key generator to the cryptographic unit;

decrypting the encrypted symmetric cryptographic key with a copy of the session key stored at the cryptographic unit to generate the symmetric cryptographic key and encrypting data with the symmetric cryptographic key to store in the removable storage media; and writing, by the cryptographic unit, the generated symmetric cryptographic key to a write only register;

wherein the write only register is inaccessible to entities that are external to the cryptographic unit; and loading a new symmetric cryptographic key into the cryptographic unit by overwriting the write only register in which the generated symmetric cryptographic key has been written with the new symmetric cryptographic key.

14. The non-transitory computer readable storage medium of claim 13, wherein the session key is unavailable for decrypting the encrypted symmetric cryptographic key while the encrypted symmetric cryptographic key is undergoing transmission across the link.

15. The non-transitory computer readable storage medium of claim 13, wherein the symmetric cryptographic key is never transmitted in clear across the link, and wherein the symmetric cryptographic key is used as an Advanced Encryption Mode (AES) cipher in the Galois/counter mode (GCM) of authentication and encryption of data.

16. The non-transitory computer readable medium of claim 13, wherein:
the storage drive in which the cryptographic key is maintained is a tape drive;
and the storage library is a tape library, wherein the tape drive is included within the tape library.

17. A method for deploying computing infrastructure, comprising integrating machine-readable code into a computing system comprising a cryptographic unit and a cryptographic key generator, wherein the code in combination with the computing system is capable of performing:

generating, by a cryptographic key generator that is maintained in a host containing a processor, a symmetric cryptographic key;

encrypting, by the cryptographic key generator, the symmetric cryptographic key with a session key that is available to both the cryptographic key generator and a cryptographic unit that is maintained in a storage drive of a storage library having a library controller and an autochanger mechanism to transfer removable storage media accessible to the storage drive;

transmitting the encrypted symmetric cryptographic key across a link from the cryptographic key generator to the cryptographic unit;

decrypting the encrypted symmetric cryptographic key with a copy of the session key stored at the cryptographic unit to generate the symmetric cryptographic key and encrypting data with the symmetric cryptographic key to store in the removable storage media; and writing, by the cryptographic unit, the generated symmetric cryptographic key to a write only register;

wherein the write only register is inaccessible to entities that are external to the cryptographic unit; and loading a new symmetric cryptographic key into the cryptographic unit by overwriting the write only register in which the generated symmetric cryptographic key has been written with the new symmetric cryptographic key.

18. The method for deploying computing infrastructure of claim 17, wherein the session key is unavailable for decrypting the encrypted symmetric cryptographic key while the encrypted symmetric cryptographic key is undergoing transmission across the link.

19. The method for deploying computing infrastructure of claim 17, wherein the symmetric cryptographic key is never transmitted in clear across the link, and wherein the symmetric cryptographic key is used as an Advanced Encryption Mode (AES) cipher in the Galois/counter mode (GCM) of authentication and encryption of data.

20. The method for deploying computing infrastructure of claim 17, wherein:
the storage drive in which the cryptographic key is maintained is a tape drive; and
the storage library is a tape library, wherein the tape drive is included within the tape library.

\* \* \* \* \*